United States Patent

[11] 3,609,160

[72] Inventors Hans Rudolf Meyer
 Basel;
 Peter Liechti, Binningen; Kurt Weber,
 Basel; Adolf Emil Siegrist, Basel, all of
 Switzerland
[21] Appl. No. 659,343
[22] Filed Aug. 9, 1967
[45] Patented Sept. 28, 1971
[73] Assignee Ciba Limited
 Basel, Switzerland
[32] Priority Aug. 15, 1966
[33] Switzerland
[31] 11756/66

[54] P,P'-BIS(BENZOXAZOLYL) TOLAN DERIVATIVES
 2 Claims, No Drawings
[52] U.S. Cl. .................................................. 260/307 D,
 252/301.2 W, 260/248 CS, 260/251 R, 260/256.4
 R, 260/290 R, 260/302 D, 260/304, 260/308 B,
 260/309.2, 260/469, 260/510, 260/544 M,
 260/558 R
[51] Int. Cl. ..................................................C07d 49/38,
 C07d 55/04, C01d 85/48
[50] Field of Search......................... .. . ......260/307 (4)

[56] References Cited
 UNITED STATES PATENTS
3,133,916 5/1964 Duennenberger et al. .. 260/240 CA
3,260,715 7/1966 Saunders............ ......... 260/240
Primary Examiner—Alton D. Rollins
Attorneys—Harry Goldsmith, Joseph G. Kolodny and Bryant
 W. Brennan ABSTRACT: The invention relates to new tolan derivatives of the general formula

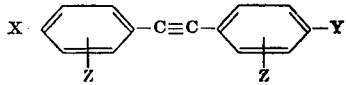

where Z stands for a hydrogen atom, a free or functionally modified carboxyl group, a free or functionally modified sulphonic acid group, Y for one of the groupings

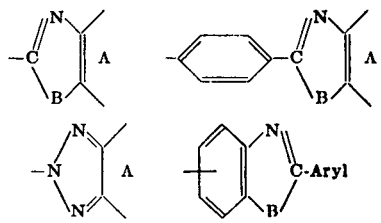

or for an s-triazinyl residue bound through a cyclic carbon atom, a pyrazolyl, oxdiazolyl, thiadiazolyl, furyl, thienyl, cumaryl, quinazolyl, pryidyl or pyrimidyl residue, in which groupings A represents a benzene or naphthalene residue condensed with the heterocycle in the indicated manner, and B represents a bridge member -O-, -S-, or NQ-, where Y stands for hydrogen or an unsubstituted or substituted alkyl group, and X stands for a group Y, a hydrogen or halogen atom, in alkoxy group, an unsubstituted or substituted alkyl group or aryl group, an aralkyl, amino, alkylamino, ureido group, a substituted ureido group, a urethane, carboxylic acid ester or amide group or an acylamino group.

P,P'-BIS(BENZOXAZOLYL) TOLAN DERIVATIVES

The present invention provides new derivatives of tolan, their use as optical brighteners and processes for their manufacture.

The new tolan derivatives of this invention correspond to the formula (1) 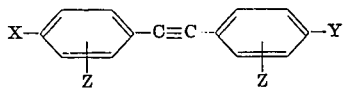

in which Z represents a hydrogen atom, a free or functionally modified carboxyl group, a free or functionally modified sulfonic acid group, Y one of the groupings

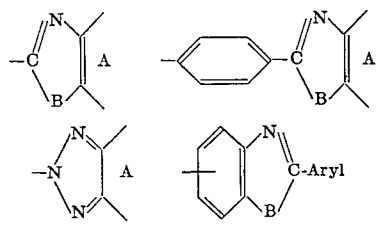

or an s-triazinyl residue linked through a cyclic carbon atom, a pyrazolyl, oxdiazolyl, thiadiazolyl, furyl, thienyl, cumaryl, quinazolyl, pyridyl or pyrimidyl residue; A in the above groupings represents a benzene or naphthalene residue condensed with the heterocycle in the indicated manner, and B stands for a bridge member -O-, -S- or -NQ-, where Q represents hydrogen or an unsubstituted or substituted alkyl group and X a group Y, a hydrogen or halogen atom, an akloxy group, an unsubstituted or substituted alkyl group or aryl group, an aralkyl group, an amino, alkylamino, ureido, substituted ureido, urethane, carboxylic acid ester or amide group or an acylamino group.

Within the scope of this definition "functionally modified carboxyl and sulfonic acid groups" are above all their esters (alkyl esters with 1 to 12 carbon atoms, benzyl esters or the like), their (unsubstituted or substituted) amides and in the case of the carboxylic acids also their nitriles.

The term "residues" as, for example, in s-triazinyl residue, indicates that these residues may contain further substituents of a nonchromophoric nature conventionally present in these cyclic systems. The symbol B stands preferably for an oxygen bridge atom. The ring system A may represent the benzene ring or a fused-on naphthalene ring, for example

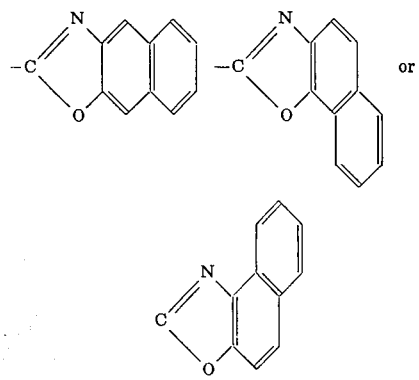

Within the definition of X the alkyl groups are above all those containing up to 18 carbon atoms, and aryl groups are preferably benzene and naphthalene residues, which may be substituted. Relevant acylamino groups are preferably those which are accessible by acylating amino groups with aliphatic saturated or unsaturated acids or derivatives (containing up to 18 carbon atoms) or aromatic acids or their derivatives (benzene-carboxylic acids, cyanuric chloride).

Within the scope defined above there are of value, for example, those tolan derivatives which correspond to the formula (2) 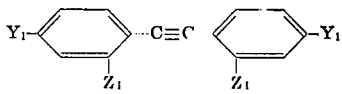

in which $Y_1$ stands for one of the groupings

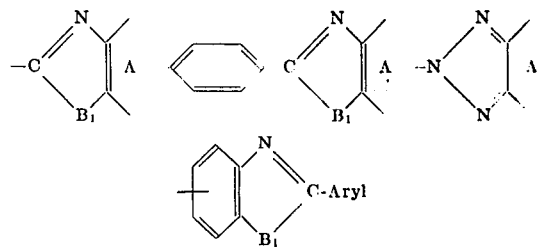

or represents an s-triazinyl, oxdiazolyl, thiadiazolyl, furyl, thienyl or cumaryl residue; A represents a benzene or naphthalene residue condensed with the heterocycle in the indicated manner, $B_1$ stands for an oxygen atom or an -NH- group, and $Z_1$ for a hydrogen atom, a sulfonic acid group or a salt or amide thereof, as well as their asymmetrically constituted oppposites of the formula (3) 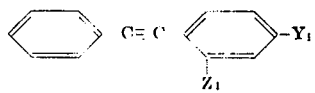

where $Y_1$ and $Z_1$ have the above meanings.

Particularly valuable, especially because of their brightening power, are compounds of the formula (4) 

in which $Y_2$ is a hydrogen atom, a phenyl group or a residue

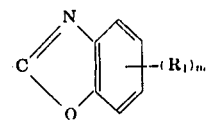

and $R_1$ represents a linear or branched alkyl group containing 1 to 12 carbon atoms, an alkoxy group with 1 to 8 carbon atoms, a halogen atom, a phenoxy or phenyl group, and $m=1$ or 2 or, when $m=1$, $R_1$ stands for a possibly functionally modified carboxyl group or sulfonic acid group or for a benzoxazolyl, benzimidazolyl or phenyloxdiazolyl residue, and, finally, two residues $R_1$ together with the benzene ring may form a naphthalene ring.

The most important subgroup of compounds of the above formula, in view of their practical value, comprises compounds of the formula (5) 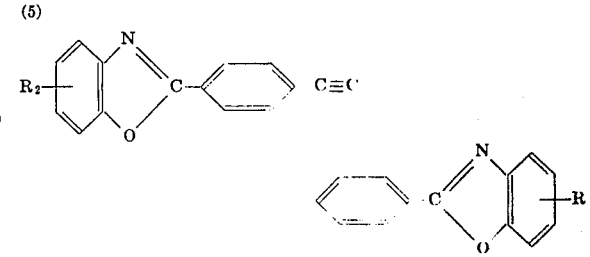

in which $R_2$ represents a hydrogen atom, an alkyl group with 1 to 4 carbon atoms or a phenyl group.

Another subgroup of compounds of the general formula (1) corresponds to the following formula (6) 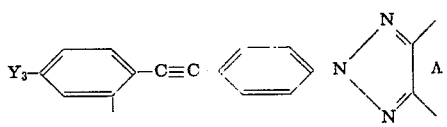

in which $Y_3$ is a hydrogen atom or a residue

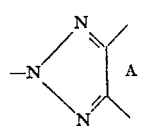

and A represents a naphthalene residue fused-on in the manner indicated by the valency lines which may be substituted, and $Z_1$ and $Z_2$ are identical or different and each stands for a hydrogen atom or a sulfonic acid group or a salt or amide thereof.

The new tolan derivatives are accessible in analogy to known methods. According to an advantageous process for manufacturing the preferred compounds of formula (4) a tolan carboxylic acid halide of the formula (7) 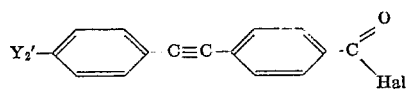

where Hal is a halogen atom and $Y_2'$ a hydrogen atom or a group

is reacted with an ortho-aminophenol of the formula (8) 

where $R_1$ and $m$ have the meanings defined above.

It is advantageous to react the acid chlorides of tolan-carboxylic acids with ortho-aminophenols, with or without intermediate isolation of the primarily formed acylamino compounds, by heating to elevated temperatures, for example to 120° to 350° C., advantageously under an inert gas, for example nitrogen, if desired or required in the presence of a catalyst. Suitable catalysts are, for example, boric acid, boric acid anhydride, zinc chloride, p-toluenesulphonic acid, also polyphosphoric acids including pyrophosphoric acid. When boric acid is used as catalyst, it is advantageously used in an amount from 0.5 to 5 percent, referred to the total weight of the reaction mass. It is also possible to use additionally high-boiling, polar organic solvents, for example dimethylformamide, dichlorobenzene or trichlorobenzene, or aliphatic, possibly etherified hydroxy compounds, for example propyleneglycol, ethyleneglycol-monoethyl ether or diethyleneglycol-diethyl ether, or high-boiling esters of phthalic acid, for example dibutylphthalate. If desired, the process may be carried out in two stages, by first condensing the carboxylic acid halide, especially chloride, with the ortho-amino compound in the presence of an organic, inert solvent such as toluene, a xylene, chlorobenzene, dichlorobenzene, trichlorobenzene or nitrobenzene, at a temperature from 100° to 200° C. and then converting the resulting acyl compound at a temperature from 150° to 350° C, if desired in the presence of a catalyst, into the azole derivative. When a carboxylic acid chloride is used as starting material, it may, if desired, be manufactured immediately before the condensation with the o-amino compound and without separation from the free carboxylic acid and thionylchloride, if desired with addition of a catalyst such as pyridine, in the solvent in which the condensation is to be carried out subsequently.

The other tolan derivatives of the general formula (1) are manufactured in a similar manner. For example, the para,para's-triazinyl-tolans are obtained by reacting tolan-dicarboxylic acid dichloride with benzonitrile and ammonia in the presence of a Friedel-Crafts catalyst such as aluminum chloride.

The compounds of the formula (1) are also obtained when a halogen, e.g. bromine is added on to the analogous stilbene compound of the formula (9) 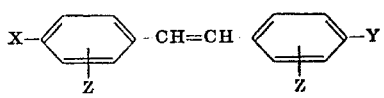

and the resulting dibromo compound of the formula

(10) 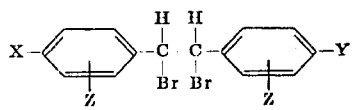

is treated with a strong alkali, for example an alkali metal hydroxide. This presupposes, of course, that the residue X and Y can withstand such an alkali treatment.

The new tolan derivatives of the composition defined above possess in the dissolved or finely disperse state a more or less pronounced fluorescence. Quite a number of these tolans are suitable as optical brighteners for a wide variety of natural or synthetic organic materials. Good results are obtained in brightening polymers, polycondensates or polyadducts, for example of epoxy resins, aldehyde resins such as formaldehyde condensates with phenol, urea or aminotriazine; also acryl resin lacquers, alkyd resin lacquers, cellulose ester lacquers, for example acetylcellulose lacquers or nitrocellulose lacquers. The new tolans are specially suited to optically brightening synthetic fibers, for example those from cellulose esters, cellulose propionate or acetylcellulose (cellulose diacetate or triacetate; acetate rayon), or especially from polyamides (for example nylon) or polyesters, or from polyolefins such as polyethylene or polypropylene, and also films, foils, tapes or shaped structures from these materials or other materials such as polyurethanes, polystyrene, polyvinylchloride, polyvinylidenechloride, polyvinyl alcohol or polyvinyl esters of organic acids, for example polyvinyl acetate or other products obtainable by polycondensation, homopolymerization or copolymerization, and finally those from regenerated cellulose, including spun rayon. The new tolans may also be used for brightening natural fibers, for example cotton, linen or wool.

The new tolans may be added to the materials to be optically brightened before, during or after the polymerization, polycondensation or polyaddition.

Accordingly, the present invention includes also a process for optically brightening organic materials, by working into or applying to said materials new tolan derivatives which preferably correspond to the formula

(11) 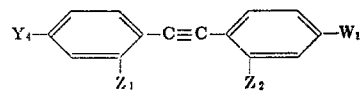

in which $Y_4$ stands for a hydrogen atom or a residue $W_1$, and $W_1$ represents a group

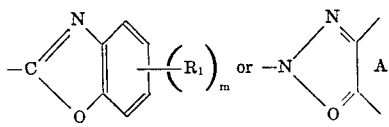

in which groups $R_1$ represents a possibly branched alkyl group with one to 12 carbon atoms, an alkoxy group with one to eight carbon atoms, a halogen atom, a phenoxy group or a phenyl group and $m=1$ or 2, or—when $m=1$—$R_1$ represents a possibly functionally modified carboxyl group or sulfonic acid group or a benzoxazolyl, benzimidazolyl or phenyloxdiazolyl residue and, finally, two residues $R_1$ together with the benzene ring may form a naphthalene ring; A represents a naphthalene residue fused-on in the manner indicated by the valency lines which may be further substituted, and $Z_1$ and $Z_2$ may be identical or different and each represents a hydrogen atom or a sulfonic acid group or a salt or amide thereof.

For optically brightening organic material as described above there are especially suitable derivatives of the formula (4)

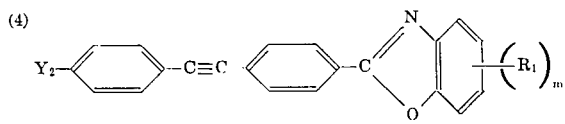

in which the symbols have the meanings defined above.

The amount of new tolan derivatives of this invention to be used, referred to the weight of the material to be optically brightened, may vary within wide limits. Even a very small quantity, in certain cases for instance as little as 0.005 percent, may suffice to produce a distinct and durable effect. It is, however, also possible to use a quantity of about 0.5 percent or more.

When the new compounds are used as optical brighteners, they may be applied in combination with carriers, antioxidants, light filters, heat stabilizers, chemical bleaches, as additives to bleaching baths, in admixture with dressings agents, in combination with detergents or in admixture with dyestuffs or pigments or as additives to dyebaths, printing pastes or the like.

It is further possible to apply the compounds of the above formula (1) fixed on a finely disperse vehicle. They may also be used as scintillators for various photographic purposes, such as electrophotographic reproduction or for supersensitizing.

EXAMPLE 1

A mixture of 3.03 g. (0.01 mol) of tolandicarboxylic acid dichloride, 2.18 g. (0.02 mol) of 1-amino-2-hydroxybenzene and 80 ml. of chlorobenzene is stirred and heated under nitrogen within 30 minutes to 115° C. and maintained at this temperature for 19 hours, after which the elimination of hydrogen chloride is complete. The batch is allowed to cool, and the pale yellow amide of the formula (12)

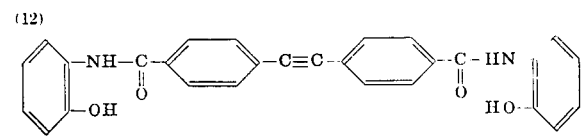

is suctioned off and dried under vacuum at 90° C., to yield 4.5 g. of a yellow powder. Without purifying this powder, it is heated dry under nitrogen in a salt bath to 325° C.; it melts, splits off water and solidifies again. It is further heated for 15 minutes at 350° C. and then allowed to cool. The grey-brown product weighs 4.0 g. (96 percent of the theoretical yield) and melts at 358° to 361° C. After recrystallization from N-methylformanilide and then from trichlorobenzene with the aid of bleaching earth, the compound of the formula (13)

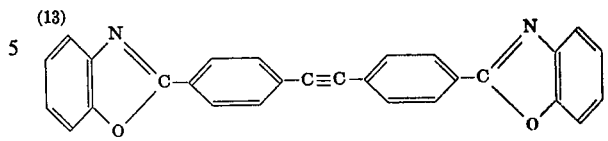

is obtained in yellowish white crystals melting at 360° to 362° C.

$C_{28}H_{16}O_2N_2$ (molecular weight 412.42)
calculated: C 81.54 H 3.91 N 6.79
found: C 81.27 H 4.11 N 6.84

An analogous reaction with the use of the corresponding aminophenols furnishes the following compounds:

(14)

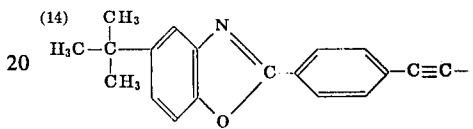

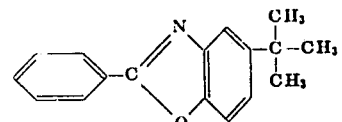

Faintly greenish yellow crystals from trichlorobenzene, melting at 294° to 296° C.
$C_{36}H_{32}O_2N_2$ (molecular weight 524.63)
calculated: C 82.41 H 6.14 N 5.34
found: C 82.18 H 6.21 N 5.36.

(15)

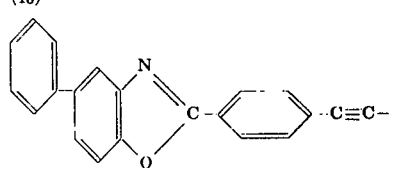

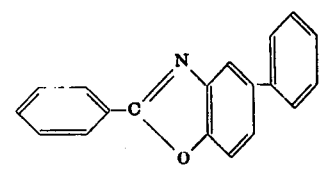

Faintly greenish yellow crystals from trichlorobenzene, melting at 343° to 345° C.
$C_{40}H_{24}O_2N_2$ (molecular weight 564.61)
calculated: C 85.09 H 4.28 N 4.96 found: C 84.67 H 4.47 N 4.85.

(16)

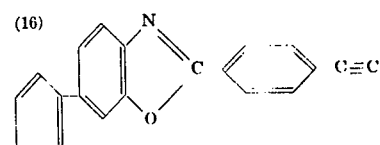

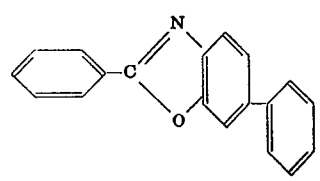

Greenish yellow crystals from trichlorobenzene, melting at 356° to 358° C.

$C_{40}H_{24}O_2N_2$ (molecular weight 564.61)
calculated: C 85.09 H 4.28 N 4.96
found: C 85.38 H 4.42 N 4.83.

MANUFACTURING THE STARTING MATERIAL

The tolandicarboxylic acid chloride can be manufactured, for example, as follows:

A solution of 486 g. (1.5 mols) of stilbene-4,4-dicarboxylic acid diethyl ester in 4.5 liters of chloroform is mixed within 2½ hours with 262 g. of bromine (10 percent excess). The batch is stirred overnight at room temperature, the crystals formed are suctioned off and washed with a small quantity of chloroform. Yield: 400 g. (67 percent of theory) of the compound of the formula

(17) 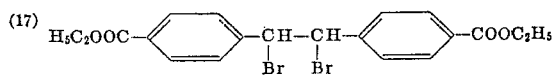

in colorless crystals melting at 192° to 194° C. Recrystallization from chlorobenzene furnishes white crystals of identical melting point.

$C_{20}H_{20}O_4Br_2$ (molecular weight 484.19)
calculated: C 49.61 H 4.16 Br 33.01
found: C 49.67 H 3.99 Br 32.88.

The yield can be increased by working up the mother liquor. 484 Grams (1 mol) of the dibromo ester described above are dissolved in 4 liters of n-butanol, 1.25 kg. of potassium hydroxide powder containing about 10 percent of water are added and the whole is stirred for 3 hours at the reflux temperature (125° C). The thick, white paste is mixed with 8 liters of water, heated by injection of steam, freed from the butanol layer with heating, and the aqueous phase is rendered acid to Congo red with hydrochloric acid. After suctioning, washing with water and drying, there are obtained 255 g. (96 percent of theory) of tolan-4,4'-dicarboxylic acid as a white powder which does not melt up to 360° C. A specimen sublimed in a high vacuum at 230° to 280° C. reveals the following analytical values:

$C_{16}H_{10}O_4$ (molecular weight 266.24)
calculated: C 72.18 H 3.79
found: C 72.07 H 4.03.

A mixture of 213 g. (0.8 mol) of tolandicarboxylic acid, 2 liters of chlorobenzene and 1 ml. of dimethylformamide is mixed at 105° C. within 70 minutes with 180 ml. of thionylchloride. The batch is stirred for 10 minutes, evaporated to dryness under vacuum and the residue is recrystallized from 1 liter of tetrachlorethylene, to yield 207 g. (85 percent of theory) of tolan-4,4'-dicarboxylic acid dichloride in the form of light beige crystals melting at 147° to 150° C. After recrystallization from perchlorethylene almost colorless crystals are obtained which melt at 148° to 150° C.

$C_{16}H_8O_2Cl_2$ CL weight 303.14)
calculated: C 63.39 H 2.66 Cl 23.39
found: C 63.35 H 2.84 Cl 23.26.

EXAMPLE 2

A mixture of 3.03 g. (0.01 mol) of tolan-4,4'-dicarboxylic acid dichloride, 12.4 g. (0.12 mol) of benzonitrile and 3.03 g. (0.027 mol) of anhydrous aluminum chloride (of 88 percent purity) is cautiously heated to 115° C. while being stirred. At first, a clear solution forms from which a nitrilium salt soon settles out as a deep red precipitate. The batch is stirred for one hour at 115° C., then diluted with 40 ml. of carbon tetrachloride and at the reflux temperature (76° C.) ammonia is injected for 75 minutes into the dark mixture, whereupon it loses its color completely. After cooling, suctioning, washing with methanol, aqueous 2N-hydrochloric acid and water and then drying, there are obtained 5.5 g. (85 percent of theory) of the compound of the formula

(18) 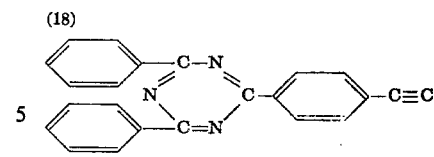

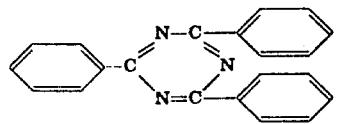

as a yellow powder melting at 362° to 367° C. After several recrystallizations from ortho-dichlorobenzene small, light greenish yellow needles are obtained which melt in the evacuated tube at 390 to 390.5° C. and reveal the following analytical data:

$C_{44}H_{28}N_6$+0.4 dichlorobenzene (molecular weight 699.53)
calculated: C 79.7 H 4.27 N 12.02 CL 4.05
found: C 79.57 H 4.41 N 12.23 CL 3.78.

When benzonitrile is replaced by p-tolunitrile, an otherwise analogous reaction furnishes the compound of the formula

(19) 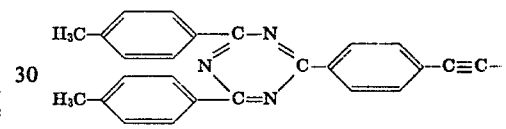

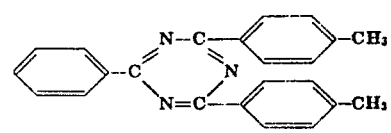

in fine, greenish yellow flakes melting at 372.5° to 373° C. (after recrystallization from ortho-dichlorobenzene).

$C_{48}H_{36}N_6$+1/6 dichlorobenzene (molecular weight 721.36)
calculated: C 81.7 H 5.12 N 11.65 CL 1.64
found: C 81.92 H 5.26 N 11.64 Cl 1.63.

example 3

A mixture of 3.03 g. (0.01 mol) of tolandicarboxylic acid dichloride (manufactured as described in example 1), 2.76 g. (0.01 mol) of 1-amino-2-nitrobenzene and 30 ml. of chlorobenzene is stirred for 2 hours at 130° C., during which hydrogen chloride is given off and a thickly liquid suspension forms. After cooling to room temperature, suctioning, washing with carbon tetrachloride and drying, there are obtained 3.9 g. (77 percent of theory) of the compound of the formula

(20) 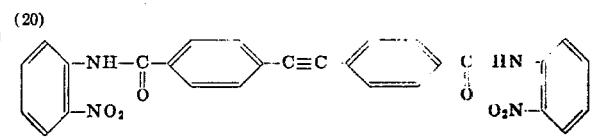

as a yellow powder melting at 264° to 267° C. This product is mixed in 150 ml. of ethyleneglycol-monomethyl ether with 20 g. of tin (II) chloride and 20 ml. of concentrated hydrochloric acid and heated, whereupon it dissolves at 98° C. The batch is heated for 3 hours at 110° C., the resulting yellow suspension is allowed to cool, stirred with 400 ml. of 10 percent sodium hydroxide solution, suctioned, the residue is washed with water until neutral and dried, to yield 3.1 g. (98 percent of theory) of the compound of the formula (21)

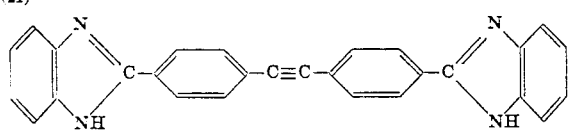

as a beige-colored powder which does not melt up to 360° C. After two recrystallizations from dimethylformamide it forms light yellow crystals.

$C_{28}H_{18}N_4$ (molecular weight 410.46)
calculated: C 81.93 H 4.42 N 13.65
found: C 80.59 H 4.59 N 13.37.

EXAMPLE 4

A mixture of 2.40 g. (0.01 mol) of tolan-4-carboxylic acid chloride, 1.85 g. of 3-hydroxy-4-aminodiphenyl and 40 ml. of chlorobenzene is stirred under nitrogen for 2 hours at the reflux temperature (131° C.), whereupon the elimination of hydrogen chloride is complete. After cooling, suctioning, washing with carbon tetrachloride and drying, there are obtained 3.15 g. (81 percent of theory) of the compound of the formula

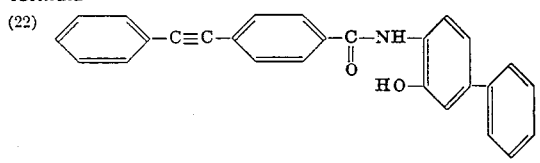

as a grey powder melting at 251° to 253° C. which is stirred for 1 hour at 213° C. in 20 ml. of trichlorobenzene with 0.1 g. of boric acid anhydride, during which about 10 ml. of trichlorobenzene and the water formed are allowed to pass over. After cooling, suctioning and washing with carbon tetrachloride there are obtained 2.7 g. (87 percent of theory) of the compound of the formula

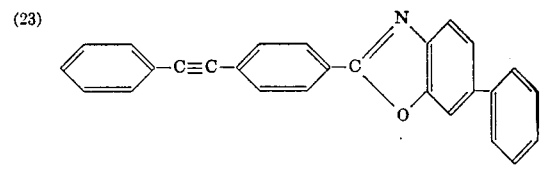

as a beige colored powder melting at 195° to 205° C. After two recrystallizations from ortho-dichlorobenzene with the aid of bleaching earth it forms pale yellow crystals melting at 196° to 198° C.

$C_{27}H_{17}ON$ (molecular weight 371.44)
calculated: C 87.31 H 4.61 N 3.77
found: C 86.01 H 4.74 N 3.79.

The tolan-4-carboxylic acid chloride used as starting material can be prepared, for example, as follows: In the course of 2 hours 70.0 g. of bromine (about 10 percent excess) are dropped into a solution of 95.2 g. (0.4 mol) of stilbene-4-carboxylic acid methyl ester in 300 ml. of chloroform, and the mixture is stirred on at room temperature, during which crystals slowly settle out from the solution. After 16 hours the batch is evaporated to dryness, to furnish 160 g. of a light brown crystallizate melting at 186° to 189° C. (Crude yield is practically quantitative). After two recrystallizations from methylenechloride the compound of the formula

(24) 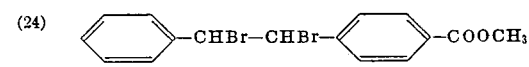

is obtained in colorless crystals melting at 196° to 198° C.

$C_{16}H_{14}O_2Br_2$ (molecular weight 398.10)
calculated: C 48.27 H 3.54 Br 40.14
found: C 48.21 H 3.74 Br 40.22.

A mixture of 39.8 g. of the dibromo ester (0.1 mol), 125 g. of potassium hydroxide (of 90 percent purity) and 400 ml. of butanol is stirred for 1 hour at the reflux temperature (129° C.), then 1 liter of water is added, the butanol layer—which contains almost the whole potassium salt of the tolancarboxylic acid—is separated in a separating funnel, evaporated to dryness, and the residue is dissolved in hot water and acidified with hydrochloric acid. After suctioning, washing with water and drying, there are obtained 18.0 g. (81 percent of theory) of tolan-4-carboxylic acid as a white powder melting at 208° to 210° C. During storage its melting point rises to 218° to 220° C. A specimen sublimed in a high vacuum at 185° to 190° C. melts at 220° to 230° C.

$C_{15}H_{10}O_2$ (molecular weight 222.23)
calculated: C 81.06 H 4.54
found: C 80.37 H 4.66.

On reaction with thionylchloride in boiling chloroform a practically quantitative yield of tolan-4-carboxylic acid chloride is obtained which, after recrystallization from chloroform, melts at 89° to 90° C.

$C_{15}H_9OCl$ (molecular weight 240.69)
calculated: C 74.85 H 3.77 CL 14.73
found: C 74.81 H 3.80 CL 14.61.

EXAMPLE 5

A mixture of 2.4 g. (0.01 mol) of tolan-4-carboxylic acid chloride (prepared as described above), 1.4 g. (0.01 mol) of 1-amino-2-nitrobenzene and 20 ml. of chlorobenzene is stirred for 2 hours at 125° to 130° C., then evaporated to dryness under vacuum and the residue is recrystallized from a small quantity of chlorobenzene, to yield 2.2 g. (64 percent of theory) of the compound of the formula

(25) 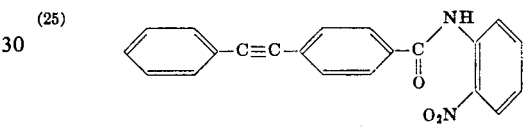

in the form of yellow crystals melting at 142° to 144° C.

The product is mixed with 100 ml. of ethyleneglycolmonomethyl ether and heated to 80° C., then 7 g. of tin(II)chloride and 13 ml. of concentrated hydrochloric acid are added, and the whole is stirred for 3 hours at 110° C. and allowed to cool. The clear solution is poured into 200 ml. of 10 percent sodium hydroxide solution, the resulting precipitate suctioned off, washed with water and dried, to yield 1.7 g. (90 percent of theory) of the compound of the formula

(26) 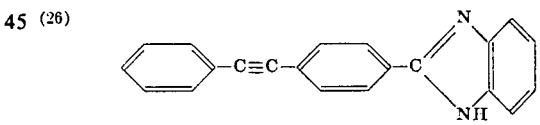

as a white powder melting powder melting at 287° to 289° C. Recrystallization from ortho-dichlorobenzene furnishes colorless crystals melting at 287° to 288° C.

$C_{21}H_{14}N_2$ (molecular weight 294.34)
calculated: C 85.69 H 4.79 N 9.52
found: C 84.93 H 4.91 N 9.35.

EXAMPLE 6

100 Grams of polyester granulate from terephthalic acid ethyleneglycol polyester are intimately mixed with 0.05 g. of the compound of the formula

(16) 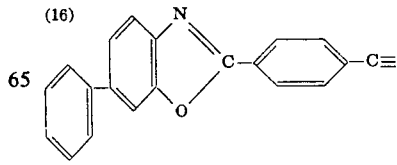
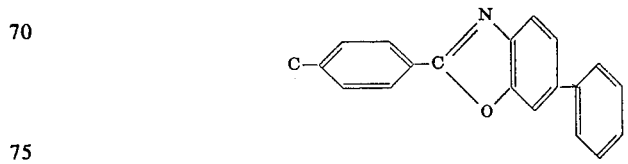

or of the formula

(15)
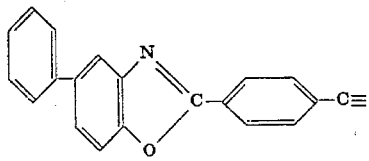

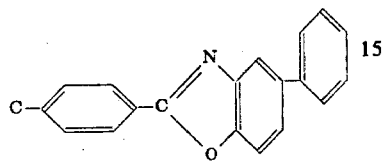

and melted at 285° C. with stirring. When this mass is spun through conventional spinnerettes and the filaments are stretched, polyester fibers displaying a good brightening effect are obtained.

EXAMPLE 7

2.22 Grams of 4'-phenyl-tolan-4-carboxylic acid in 20 ml. of trichlorobenzene are converted with 8 ml. of thionylchloride into the acid chloride by short heating at 95° C., then the solution is freed from excess thionylchloride under vacuum and 1.38 g. of 3-hydroxy-4-aminodiphenyl are added. The batch is heated under nitrogen within 2 hours to 210° C., during which at first hydrogen chloride and then water escapes, the whole is further stirred for 2 hours at 210° to 212° C., allowed to cool, suctioned, washed with carbon tetrachloride and dried, to yield 3.2 g. of the crude compound of the formula

(27)
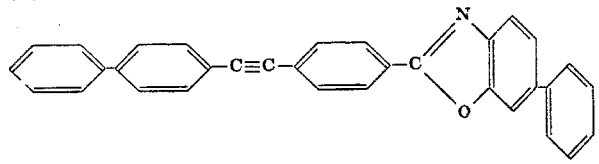

as grey crystals melting at 245° to 247° C. Two recrystallizations from dioxane with the aid of bleaching earth furnish pale yellow crystals at 248° to 249° C.

$C_{33}H_{21}ON$ (molecular weight 447.54)
calculated: C 88.57 H 4.73 N 3.13
found: C 87.76 H 4.99 N 3.11.

The 4'-phenyl-tolan-4-carboxylic acid used as starting material is accessible by the method described in example 4 for the manufacture of tolan-carboxylic acid from phenyl-stilbenecarboxylic acid via the following intermediate stages:

(28)
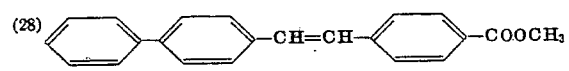

practically colorless crystals from dioxane, melting at 232° to 234° C.

$C_{22}H_{18}O_2$ (molecular weight 314.36)
calculated: C 84.05 H 5.77
found: C 83.76 H 5.72.

(29)

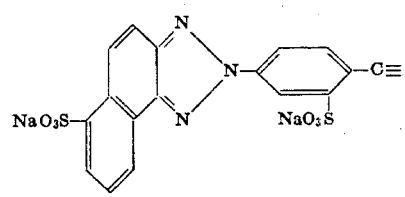

colorless powder, melting at 216° to 218° C.

(30)

colorless crystals from glacial acetic acid, melting at 291° C.
$C_{21}H_{14}O_2$ (molecular weight 298.32)
calculated: C 84.54 H 4.73
found: C 84.59 H 4.81.

EXAMPLE 8

A solution of 51 g. (0.1 mol) of 4,4'-diaminotolan-2,2'-disulfonic acid (72 percent), in the form of the disodium salt, in one-half liter of water is mixed with a solution of 138 g. of sodium nitrite in 100 ml. of water, and the batch is indirectly tetrazotized for one-half hour with 50 ml. of concentrated hydrochloric acid in 150 ml. of ice water at 6° to 8° C. After 1 hour a slight excess of nitrous acid is decomposed with sulfamic acid. The suspension of the tetrazo compound is then added to a solution of 44.6 g. (0.2 mol) of 2-aminonaphthalene-5sulfonic acid, 10.6 g. (0.1 mol) of sodium carbonate and 50 g. of crystalline sodium acetate in one-half liter of water. On completion of the coupling the reaction mixture (pH=4.3) is neutralized with 28 g. of sodium carbonate and the deep red bis-ortho-aminoazo dye is precipitated with 400 g. of sodium chloride and suctioned off. The moist dye is then dissolved in one-half liter of hot water with addition of 40 ml. of concentrated ammonia, and a solution of 120 g. of crystalline copper sulfate in 480 ml. of water and 240 ml. of concentrated ammonia is mixed in. The mixture is stirred at 82° C. until the red color has disappeared and after cooling the bis-triazole compound is salted out with sodium chloride. The filtered-off crude product is washed with dilute ammonia and in the usual manner purified and dried. Recrystallization from water, if necessary with addition of a small quantity of sodium chloride, furnishes the tetrasodium salt of the formula $C_{34}H_{18}O_{13}N_6S_4Na_4$ (molecular weight 938.76)
calculated: C 43.50 H 1.93 N 8.95 S 13.66
found: C 43.54 H 2.12 N 8.88 S 13.80.

EXAMPLE 9

41.4 Grams (0.1 mol) of 4,4'-diaminotolan-2,2'-disulfonic acid (89 percent) in the form of the sodium salt are dissolved in 450 ml. of water and 20.8 ml. of 30 percent sodium hydroxide solution, and 14.0 g. (0.2 mol) of sodium nitrite are added. The solution is dropped within 30 minutes at 8° to 10° C. into a solution of 50 ml. of concentrated hydrochloric acid in 150 ml. of water. On completion of the diazotization (identification with potassium iodide-starch) the suspension of the tetrazo compound is added to a cooled solution of 45.0 g. (0.2 mol) of 2-naphthyl-amine-1-sulfonic acid, 20.7 ml. of 29 percent sodium hydroxide solution and 50 g. of crystalline sodium acetate in one-half liter of water. The suspension is stirred for 2 hours at 8° to 10° C. (pH=4.3) and neutralized with concentrated sodium hydroxide solution. On completion of the coupling the deep red bis-ortho-aminoazo dye is suctioned off and stirred into a solution of 200 g. of copper acetate in 200 ml. of water and 100 ml. of concentrated ammonia. The whole is heated at about 90° C. until the red color has disappeared, allowed to cool, filtered and the residue is washed with a small quantity of water. Recrystallization from aqueous dimethylformamide with the use of active carbon and drying in a high vacuum at 100° C. furnishes the hygroscopic disodium salt of the formula

(32)
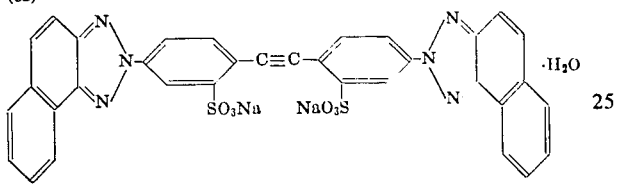

$C_{34}H_{20}O_7N_6S_2Na_2$ (molecular weight 734.68)
calculated: C 55.59 H 2.74 N 11.44 S 8.73
found: C 55.38 H 3.12 N 11.21 S 8.10.

In an analogous manner, with the use of 2-naphthylamine-6-sulfonic acid or 2-naphthylamine-7-sulfonic acid as coupling component, the compounds of the formulas (33) and (34) are obtained:

(33)
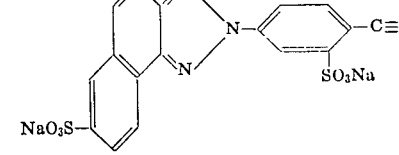

calculated: N 8.95 S 13.66
found: N 8.63 S 13.66

(34)

calculated: N 8.95 S 13.66
found: N 8.68 S 13.41

The use of 2-naphthylamine-5,7-disulfonic acid as coupling component gives rise to the sodium salt of hexasulfonic acid of the formula

(35)
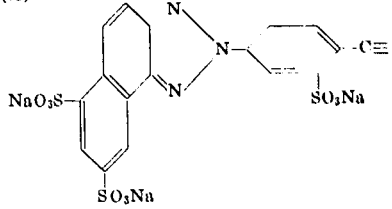

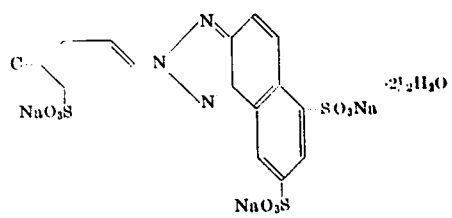

calculated: N 7.18 S 16.44
found: N 7.41 S 16.49.

EXAMPLE 10

When 3-methoxy-p-toluidine is used as coupling component in the process of example 9, the compound of the formula (36) is obtained on recrystallization from dimethylformamide.

(36)
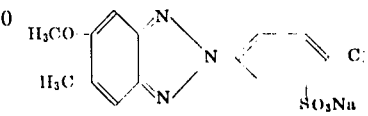

$C_{30}H_{24}O_9N_6S_2Na_2$ (molecular weight 722.66)
calculated: C 49.86 H 3.35 N 11.63 S 8.87
found: C 49.78 H 3.65 N 11.94 S 8.89.

When 5-aminoacenaphthene is used as coupling component in the process of example 8, the compound of the formula (37) is obtained; it crystallizes from aqueous dimethylsulphoxide.

(37)
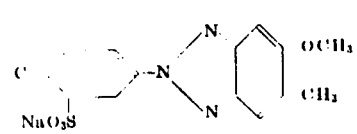

EXAMPLE 11

A fine suspension of 5.3 g. of 4,4'-diaminotolan in 200 ml. of water and 12.5 ml. of hydrochloric acid is diazotized with a solution of 3.5 g. of sodium nitrite in 20 ml. of water. The tetrazo compound is coupled with 11.3 g. of 2-naphthylamine-5-sulfonic acid as described in example 8 and the red dye is oxidized with a solution of 25 g. of copper acetate in 25 ml. of water, 25 ml. of concentrated ammonia and 125 ml. of pyridine, to yield the compound of the formula (38)

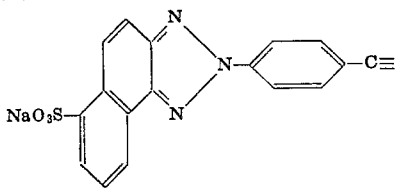

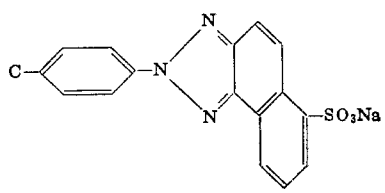

which is recrystallized from dimethylformamide.
$C_{34}H_{18}O_6S_2Na_2$ (molecular weight 716.66)
calculated: N 11.73 S 8.95
found: N 11.4 S 8.9.

EXAMPLE 12

Bleached cotton fabric is washed for 30 minutes at a goods-to-liquor ratio of 1:30 in a liquor heated at 60° C. which contains per liter the following ingredients:

0.02 g. of the brightener of the formula (32)

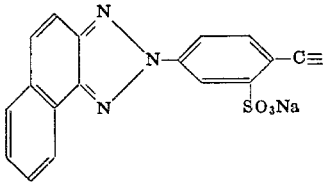

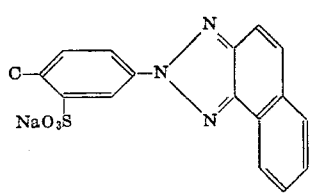

1 g. of active chlorine (Javelle water)
4 g. of a detergent of the following composition:
   15% dodecylbenzenesulphonate
   15% sodium laurylsulfate
   35% sodium tripolyphosphate
   28% calcined sodium sulfate (Glauber's salt)
   5% sodium metasilicate
   2% carbomethoxycellulose.

After having been rinsed and dried, the fabric displays a very strong brightening effect which has good fastness to acids and chlorine.

We claim:

1. A compound of the formula

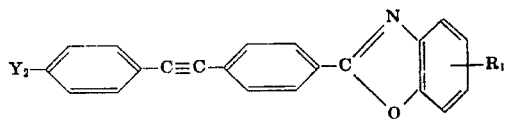

where $Y_2$ represents a member selected from the group consisting of hydrogen, phenyl or the residue

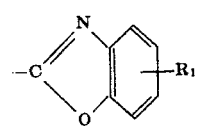

and where $R_1$ represents a member selected from the group consisting of an alkyl group containing 1 to 12 carbon atoms, and phenyl.

2. A compound according to claim 1 having the formula

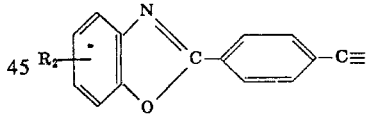

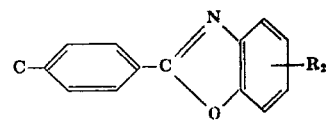

where $R_2$ stands for hydrogen, an alkyl group containing 1 to 4 carbon atoms or phenyl.

5988/E

PO-1050
(5/69)

UNITED STATES PATENT OFFICE
CERTIFICATE OF CORRECTION

Patent No. 3,609,160      Dated September 28, 1971

Inventor(s) HANS RUDOLF MEYER ET AL

It is certified that error appears in the above-identified patent and that said Letters Patent are hereby corrected as shown below:

Column 16, line 36, after "consisting of" insert
--- hydrogen ---.

Signed and sealed this 13th day of June 1972.

(SEAL)
Attest:

EDWARD M. FLETCHER, JR.    ROBERT GOTTSCHALK
Attesting Officer    Commissioner of Patents